(12) United States Patent
Geiger

(10) Patent No.: US 7,417,636 B2
(45) Date of Patent: Aug. 26, 2008

(54) METHOD AND APPARATUS FOR AUTOMATIC SETTING OF RENDERING PARAMETER FOR VIRTUAL ENDOSCOPY

(75) Inventor: Bernhard Geiger, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 699 days.

(21) Appl. No.: 10/838,064

(22) Filed: May 3, 2004

(65) Prior Publication Data

US 2004/0259065 A1    Dec. 23, 2004

Related U.S. Application Data

(60) Provisional application No. 60/468,907, filed on May 8, 2003.

(51) Int. Cl.
*G06T 17/00* (2006.01)
(52) U.S. Cl. ..................................... 345/424
(58) Field of Classification Search ................. 345/424
See application file for complete search history.

(56) References Cited

U.S. PATENT DOCUMENTS

| | | | |
|---|---|---|---|
| 6,331,116 B1 * | 12/2001 | Kaufman et al. | 434/262 |
| 2002/0183606 A1 | 12/2002 | Bochler et al. | |
| 2003/0068082 A1 | 4/2003 | Comaniciu et al. | 382/162 |

FOREIGN PATENT DOCUMENTS

| | | |
|---|---|---|
| EP | 1225544 A2 | 7/2002 |
| WO | WO 02/103065 A2 | 12/2002 |

OTHER PUBLICATIONS

Kindlmann G, "Transfer Functions in Direct Volume Rendering: Design, Interface, Interaction", *SIGGRAPH Course Notes*, 2002, pp. 1-6.

Kindlmann G et al, "Semi-Automatic Generation of Transfer Functions for Direct Volume Rendering", *Volume Visualization*, 1998, IEEE Symposium on Research, Triangle Park, NC USA Oct. 19-20, 1998; New York, NY, USA, IEEE, US, Oct. 19, 1998; pp. 79-86.

Pekar V et al, "Fast Detection of Meaningful Isosurfaces for Volume Data Visualization", *Proceedings Visualization* 2001, San Diego, CA, Oct. 21-26, 2001; Annual IEEE Conference on Visualization, New York, NY, IEEE, US, Oct. 21, 2001, pp. 223-227.

He T et al, "Generation of Transfer Functions with Stochastic Search Techniques", *Visualization '96*, Proceedings of the Visualization Conference, San Francisco, Oct. 27,-Nov. 1, 1996, Proceedings of the Visualization Conference, New York, IEEE? ACM, US, Oct. 27, 1996, pp. 227-234.

(Continued)

*Primary Examiner*—Almis R. Jankus
(74) *Attorney, Agent, or Firm*—Donald B. Paschburg; F. Chau & Associates, LLC

(57) ABSTRACT

A method for automatically setting a rendering parameter for a virtual endoscope for rendering images for virtual endoscopy, comprises deriving a data set corresponding to an inside view of a viewing frustum of the endoscope; calculating a histogram from the data set; correlating features of the histogram with known physical regions wherein the endoscope is situated; and selecting a transfer function positioned relative to the features of the histogram for providing image differentiation between respective rendered images of the physical regions in the images.

10 Claims, 4 Drawing Sheets

OTHER PUBLICATIONS

Marks J et al, "Design Galleries: A General Approach to Setting Parameters for Computer Graphics and Animation", Computer Graphics Proceedings, SIGGRAPH 97, Los Angeles, Aug. 3-8, 1997, Reading, Addison Wesley, US, Aug. 3, 1997, pp. 389-400.

Weinert K et al, "New Solutions for Surface Reconstruction From Discrete Point Data by Means of Computational Intelligence", International Seminar on Intelligent Computation in Manufacturing Engineering, 1998, pp. 431-438.

Search Report (including Notification of Transmittal of the International Search Report, International Search Report, and Written Opinion of the International Searching Authority).

Kindlmann G: "Transfer Functions in Direct Volume Rendering: Design, interface, Interaction" SIGGRAPH Course Notes, 2002, pp. 1-6, XP002318414 the whole document.

Kindlmann G et al: "Semi-automatic generation of transfer functions for direct volume rendering" Volume Visualization, 1998. IEEE Symposium on Research Triangle Park, NC, USA Oct. 19-20, 1998. New York, NY, USA, IEEE, US, 79-86, 170, XP010313221 ISBN: 0-8186-9180-8 cited in the application the whole document.

Pekar V et al Institute of Electrical and Electronics Engineeers: "Fast detection of meaningful isosurfaces for volume data visualization" Proceedings Visulaization 2001. VIS 2001. IEEE Conference on Visulatization, New York, NY: IEEE, US, Oct. 21, 2001, pp. 223-227, XP002246128 ISBN: 0-7803-7200-X the whole document.

WO 02/103065 A (Koninklijke Philips Electronics N.V; Wiemker, Rafael; Pekar, Vladimir;) Dec. 27, 2002 Claim 7.

Okada Kazunori et al: "Scale selection for an anisotropic scale-space: Application to volumetric tumor characterization" Proc IEEE Comput Soc Conf Comput Vision Pattern Recognit; Proceedings of the IEEE Computer Society Conference on Computer Vision and Pattern Recognition; Proceedings of the 2004 IEEE Computer Society Conference on Computer Vision and Patten Recognit, vol. 1, 2004, pp. 1594-1601, XP002322547 the whole document.

Tony Lindeberg: "Scale-Space Theory in Computer Vision" 1994, Kluwer Academic Publishers, XP002323529 Chapter 15: "Non-uniform" smoothing.

\* cited by examiner

METHOD AND APPARATUS FOR AUTOMATIC SETTING OF RENDERING PARAMETER FOR VIRTUAL ENDOSCOPY

CROSS-REFERENCE TO RELATED APPLICATIONS PRIORITY

Specific reference is hereby made to Provisional Application No. 60/468,907, entitled AUTOMATIC SETTING OF RENDERING PARAMETER FOR VIRTUAL ENDOSCOPY, filed May 8, 2003 in the name of Bernhard Geiger, the inventor in the present application and of which the benefit of priority is claimed and whereof the disclosure is hereby incorporated herein by reference.

The present application relates generally to computer vision and imaging systems and, more particularly, to computerized imaging as applied to virtual endoscopy and related fields.

BACKGROUND OF THE INVENTION

Virtual colonoscopy (VC) refers to a method of diagnosis based on computer simulation of standard, minimally invasive endoscopic procedures using patient specific three-dimensional (3D) anatomic data sets. Examples of current endoscopic procedures include bronchoscopy, sinusoscopy, upper gastro-intestinal endoscopy, colonoscopy, cystoscopy, cardioscopy, and urethroscopy. VC visualization of non-invasively obtained patient specific anatomic structures avoids risks, such as perforation, infection, hemorrhage, and so forth, associated with real endoscopy, and provides the endoscopist with important information prior to performing an actual endoscopic examination. Such understanding can minimize procedural difficulties, decrease patient morbidity, enhance training and foster a better understanding of therapeutic results.

In virtual colonoscopy, 3D images are created from two-dimensional (2D) computerized tomography (CT) or magnetic resonance (MR) data, for example, by volume rendering. Volume rendering, as such, is a known technique for interpreting volume data. Present-day CT and MRI scanners typically produce a set of cross-sectional images which, in combination, produce a set of volume data. These 3D images are created to simulate images coming from an actual endoscope, such as a fiber optic endoscope.

The computerized post-processing of imaging data from cross-sectional imaging modalities is presently of importance in the field of medicine Typically, the Volume Rendering Technique (VRT) requires rendering settings that include a classification function that defines the visibility of materials present in the data set. The classification function is also referred to herein as a transfer function or rendering setting. It is generally assumed that different materials map to different intensity levels and therefore the classification function maps intensity levels to respective opacity values. Thus, the classification function essentially determines which voxel will be rendered, and which voxel will be invisible or "transparent"; a low opacity value results in a translucent or even invisible object while a high opacity value results in a clearly visible object. See, for example, the textbook "Virtual Endoscopy and Related 3D Techniques," edited by A. L. Baert; Springer, New York; 2001, 2002.

In many systems, this can be carried out interactively. A user can manipulate a simple transfer function such as, for example, trapezoid, and can see immediately the result. He can then adjust it until he gets the images desired. In some cases, this function can be extremely complicated, so that adjusting takes considerable time. If the relation of voxel value to tissue is known, such as for example in CT, where air, water, etc have known values, preset functions can be used. But in cases where the voxel values are not known, such as, for example, in MR, or CT with an unknown amount of contrast agent in the blood, the user has to adjust the transfer function to each individual case.

In the worst case, the user needs to adjust the transfer functions not only per case, but also depending on the location in the dataset where being looked at. An example would be virtual endoscopy of MR data. MR data is usually not homogeneous; the contrast varies at different locations. Unlike conventional 3D rendering that shows a body from the outside and therefore requires that the rendering parameters be adjusted globally, Virtual Endoscopy only shows very local parts of the body, such as, for example, the inside of a part of the colon, or the inside of an airway. Because the region that is rendered is local, the rendering parameters have to be adjusted to the local data in order to produce optimal quality.

Taosong He et al., in the article entitled Generation of Transfer Functions with Stochastic Search Techniques, IEEE 1996, propose a solution with 3 different quality criteria: maximizing first order image entropy, maximizing variance of pixels in final image, or maximizing edge energy in the final image. None of these criterions takes into account 3D features such as 3D surface normals or local properties of the input data (histogram).

Kindlmann G. L. in the article entitled Semi-Automatic Generation of Transfer Functions for Direct Volume Rendering Dissertation, Cornell University, 1999 proposes a technique to render material boundaries in volume dataset. In a first step, the data is analyzed by calculating first and second order derivatives. In a second step, the user has to select regions and decide what to render. Although this technique facilitates the creation of rendering parameters, it is not automatic in the sense that the user still has to adjust parameters and evaluate the quality visually.

BRIEF SUMMARY OF THE INVENTION

It is herein recognized that a virtual flythrough of such data would require a corresponding re-adjustment of the transfer function every few frames in order to show a high quality image throughout the flythrough range.

In accordance with aspects of the present invention, a number of methods are herein disclosed for automatically adjusting rendering settings to data characteristics.

In accordance with an aspect of the invention, a method for automatically setting a rendering parameter for a virtual endoscope for rendering images for virtual endoscopy, comprises the steps of: deriving a data set corresponding to an inside view of a viewing frustum of the endoscope; calculating a histogram from the data set; correlating features of the histogram with known physical regions wherein the endoscope is situated; and selecting a transfer function positioned relative to the features of the histogram for providing image differentiation between respective rendered images of the physical regions in the images.

In accordance with another aspect of the invention, the step of selecting a transfer function comprises selecting and positioning the transfer function relative to the features of the histogram for providing optimal image differentiation between respective rendered images of first and second ones of the physical regions.

In accordance with another aspect of the invention, the step of selecting a transfer function comprises selecting and positioning the transfer function relative to the features of the histogram for providing optimal image differentiation between respective rendered images of air and soft tissue respectively.

In accordance with another aspect of the invention, the step of a selecting a transfer function includes a step of positioning the transfer function such that a first selected one of the physical regions is rendered as a transparent image.

In accordance with another aspect of the invention, the step of positioning the transfer function includes a step of selecting a closest physical region to the endoscope.

In accordance with another aspect of the invention, the step of positioning the transfer function comprises positioning the transfer function for maximum contrast between the transparent image and a respective image of a second selected one of the physical regions.

In accordance with another aspect of the invention, the step of positioning the transfer function comprises positioning the transfer function for maximum contrast between the transparent image and a respective image of a second selected one of the physical regions.

In accordance with another aspect of the invention, a method for automatically setting a rendering parameter for a virtual endoscope for In accordance with another aspect of the invention,rendering images for virtual endoscopy, comprises the steps of: calculating a histogram H1 in area relatively close to the virtual endoscope; calculating a histogram H2 in area at a relatively greater distance to the endoscope; calculating a histogram H3 in area comprising H1 and H2; identifying a given peak P1 in histogram H1 as material that will be set to be transparent; identifying a given peak P2≠P1 in histogram H2 as material that will be set to be oblique; analyzing histogram H3 and setting the rendering parameter at minimum between the peaks P1 and P2; and rendering the image using the transfer function.

In accordance with another aspect of the invention, a method for automatically setting a rendering parameter for a virtual endoscope for rendering images for virtual endoscopy, comprises the steps of: deriving a data set corresponding to an inside view of a viewing frustum of the endoscope; rendering a plurality of images from the data set utilizing for each such image a respective rendering setting; utilizing a predetermined criterion to determine a respective quality factor for each such image; selecting as a preferred image one of the images exhibiting a quality factor having a maximum value of the respective quality factors; storing a preferred rendering setting associated with the preferred image; and utilizing the preferred rendering setting for rendering an image from the data set.

In accordance with another aspect of the invention, the step of utilizing a predetermined criterion comprises utilizing a smoothness criterion.

In accordance with another aspect of the invention, the step of rendering a plurality of images comprises utilizing ray casting for deriving a plurality of pixels for each of the plurality of images; the step of utilizing a predetermined criterion comprises: calculating a respective surface normal based on lighting criteria for each of the pixels, and comparing a surface normal for a given pixel with a surface normal for a neighboring pixel in the same row to derive a first angle between their normals; and the step of utilizing a predetermined criterion comprises assigning a quality factor having the highest value for an image exhibiting the least number of faults where a fault is defined as the first angle exceeding predetermined value.

In accordance with another aspect of the invention, the step of rendering a plurality of images comprises: utilizing ray casting for deriving a plurality of pixels for each of the plurality of images, and arranging the pixels in rows and columns; the step of utilizing a predetermined criterion comprises: calculating a respective surface normal based on lighting criteria for each of the pixels, and comparing a surface normal for a given pixel with a surface normal for a pixel in the same row to derive a first angle between their normals and with a surface normal of a pixel in the same column to derive a second angle between their normals; and the step of utilizing a predetermined criterion comprises assigning a quality factor having the highest value for an image exhibiting the least number of faults where a fault is defined as at least one of the first and second angles exceeding a predetermined value.

In accordance with another aspect of the invention, the step of rendering a plurality of images comprises utilizing ray casting for deriving a plurality of pixels for each of the plurality of images; the step of utilizing a predetermined criterion comprises: comparing color data for a given pixel with color data for a neighboring pixel, and deriving a color difference therebetween; and the step of utilizing a predetermined criterion comprises assigning a quality factor having the highest value for an image exhibiting the least number of faults where a fault is defined as the color difference exceeding predetermined value.

In accordance with another aspect of the invention, the step of rendering a plurality of images comprises: utilizing ray casting for deriving a plurality of pixels for each of the plurality of images; arranging the pixels in rows and columns; the step of utilizing a predetermined criterion comprises comparing color data for a given pixel with color data for a pixel in the same row to derive a first color difference therebetween and with color data for a pixel in the same column to derive a second color difference therebetween; and the step of utilizing a predetermined criterion comprises assigning a quality factor having the highest value for an image exhibiting the least number of faults where a fault is defined as at least one of the first and second color differences exceeding a predetermined value.

In accordance with another aspect of the invention, a method for automatically setting a rendering parameter for a virtual endoscope for rendering images for virtual endoscopy, comprises the steps of: deriving a data set corresponding to an inside view of a viewing frustum of the endoscope; rendering an image from the data set n times with parameter settings $P_i$ ($0 \leq i < n$); calculating a quality $Q_i$ for each such rendering; selecting a parameter $P_{max}$ which has highest quality $Q_{max} \geq Q_i$; $0 \leq i < n$ and $0 \leq max < n$; and render a final image with parameter setting $P_{max}$.

In accordance with another aspect of the invention, apparatus for automatically setting a rendering parameter for a virtual endoscope for rendering images for virtual endoscopy, comprises: apparatus for calculating a histogram H1 in area relatively close to the virtual endoscope; apparatus for calculating a histogram H2 in area at a relatively greater distance to the endoscope; apparatus for calculating a histogram H3 in area comprising H1 and H2; apparatus for identifying a given peak P1 in histogram H1 as material that will be set to be transparent; apparatus for identifying a given peak P2≠P1 in histogram H2 as material that will be set to be oblique; apparatus for analyzing histogram H3 and setting the rendering parameter at minimum between the peaks P1 and P2; and apparatus for rendering the image using the transfer function.

In accordance with another aspect of the invention, apparatus for automatically setting a rendering parameter for a virtual endoscope for rendering images for virtual endoscopy, comprises: apparatus for deriving a data set corresponding to an inside view of a viewing frustum of the endoscope; apparatus for rendering an image from the data set n times with parameter settings $P_i$ ($0 \leq i < n$); apparatus for calculating a quality $Q_i$ for each such rendering; apparatus for selecting a parameter $P_{max}$ which has highest quality $Q_{max} \geq Q_i$; $0 \leq i < n$ and $0 \leq max < n$; and apparatus for render a final image with parameter setting $P_{max}$.

BRIEF DESCRIPTION OF THE SEVERAL VIEWS OF THE DRAWINGS

The invention will be more fully understood from the detailed description which follows in conjunction with the drawings in which.

DETAILED DESCRIPTION OF THE INVENTION

It will be understood that the method and system of the present invention are best implemented utilizing a programmable digital computer and that the operations herein described are in reference to such an implementation. In the context of imaging, terms such as "air", "lumen", etc. are typically intended to refer to the corresponding imaging of these features.

In accordance with a first principle of the invention, a histogram is used as a basis for automatically adjusting rendering settings to data characteristics. In one embodiment of the invention, the histogram is calculated of the data inside a viewing frustum. In the present context, the viewing frustum is taken to mean the viewing pyramid that one gets when one has a view point and a perspective projection, together with a square, or rectangular, image plane. The frustum is the part of this pyramid between the front clipping plane and the back clipping plane.

Additional information can be used to determine the best setting for rendering. For example, it might be known that the virtual endoscope is situated inside a particular structure, such as the colon, for example. The material immediately surrounding the endoscope thus has to be set to "transparent", otherwise the view of the endoscope will be obscured. In the example of the colon, the tissue surrounding the endoscope is low contrast, that is, air. Accordingly a transfer function should be set up to separate air from soft tissue in the histogram of the local viewing frustum.

Figure 1:
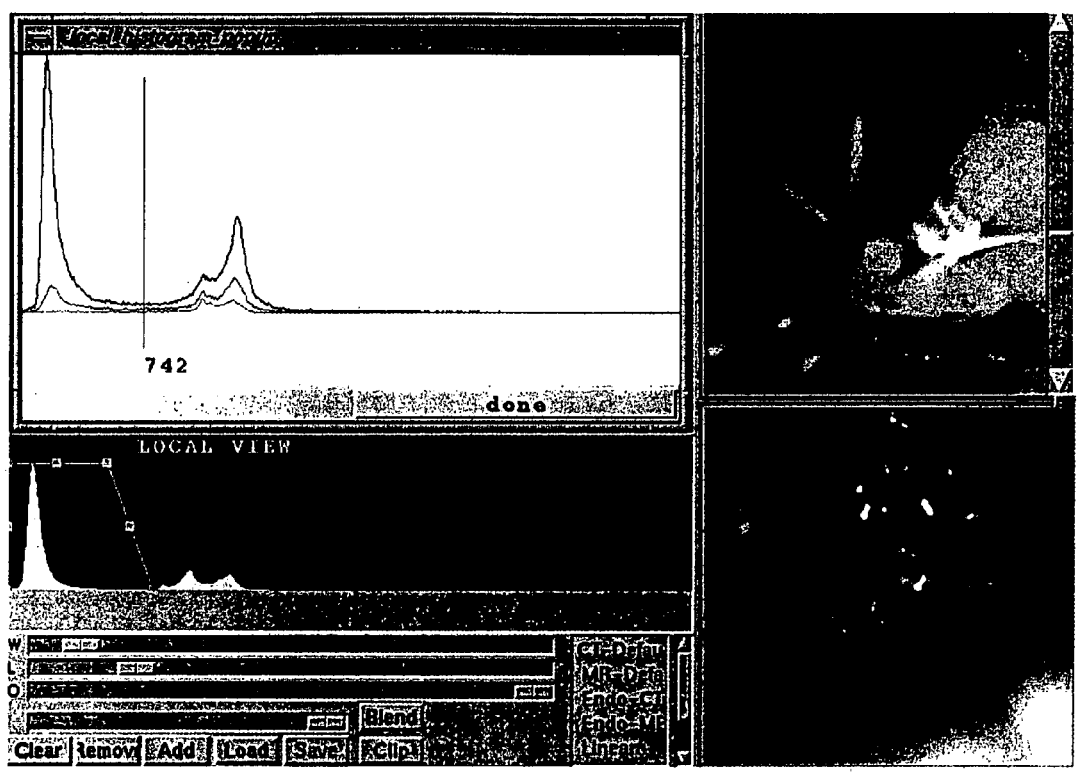
FIG. 1 shows a histogram based transfer function selection in accordance with an embodiment of the present invention.

FIG. 1 shows a histogram based transfer function selection in accordance with an embodiment of the present invention. CT data is sampled around the endoscope in 3 regions, and the histograms are calculated (upper left). The red line shows a histogram adjacent to the endoscope. The blue line is the histogram of a larger region around the endoscope, and the black line is the largest region. The histogram shows two distinct peaks, one for air and one for contrast and soft tissue. The endoscope is situated inside contrast; therefore contrast agent has to be selected as transparent. Below is the actual transfer function, and on the right is the corresponding 3D rendering.

In accordance with another embodiment of the present invention, rendering is used as a basis for automatically adjusting rendering settings to data characteristics. Images are rendered with different rendering settings. A quality factor is calculated after each rendering. The rendering setting that produces the best quality is stored and used. The quality setting can be smoothness.

Ray casting is a commonly used method for volume rendering. See, for example, the above-cited text edited by A. L. Baert. If ray casting is used for the rendering, at each pixel the surface normal is calculated for lighting calculations. The surface normals of the previous pixel (row) and of the pixel above (column) are now compared. If the angle between the normals is larger than a given value, for example 18 degrees (determined experimentally), there is a discontinuity in the surface. Bad rendering settings increase surface discontinuities. If the threshold is too low, noise is rendered as random blocks flying in the air. If the threshold is too high, the walls will show holes, which again increase the number of surface discontinuities. The program renders images using different rendering settings, and measures the number of surface discontinuities at each step. The setting with the lowest number is considered to produce the best image quality. Other quality measures can be used, such as color change between neighboring pixels.

Figure 2:
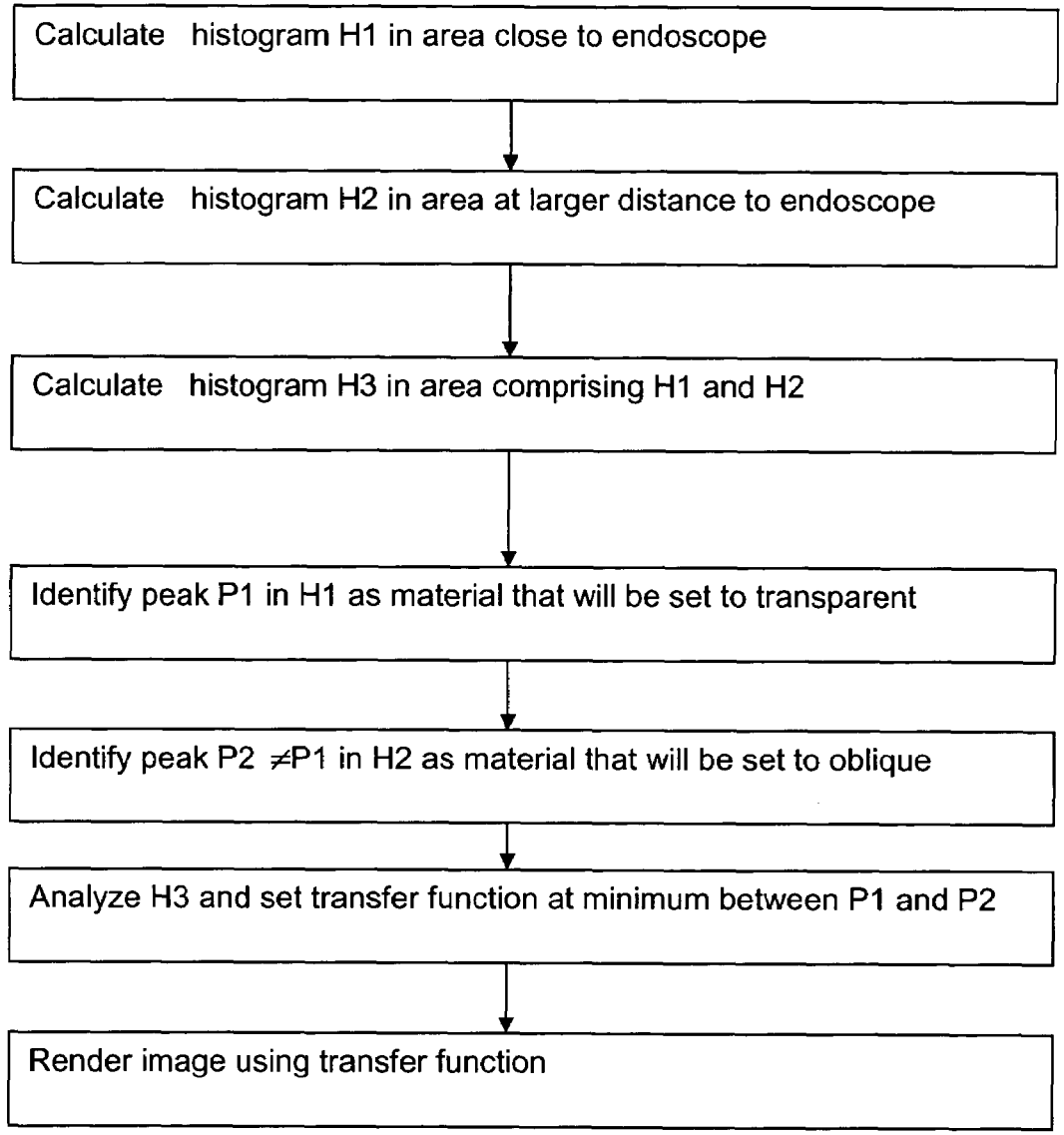
FIG. 2 shows a flow chart showing steps of a method in accordance with the present invention, utilizing a histogram based transfer function selection for automatically adjusting rendering settings to data characteristics.
Figure 3:
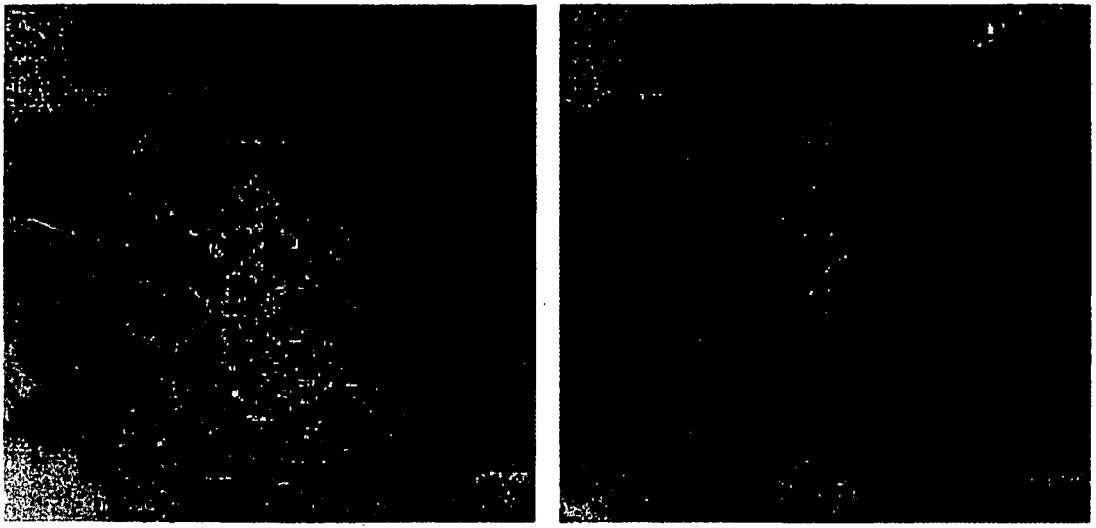
FIG. 3 shows image based adjustment in accordance with an embodiment of the present invention wherein rendering is used as a basis for automatically adjusting rendering settings to data characteristics.

FIG. 2 shows a flow chart showing steps of a method in accordance with the present invention, utilizing a histogram based transfer function selection for automatically adjusting rendering settings to data characteristics;

FIG. 3 shows image based adjustment in accordance with an embodiment of the present invention wherein rendering is used as a basis for automatically adjusting rendering settings to data characteristics. The left-hand side of FIG. 3 shows rendering with a threshold of 13, indicating a level of noise. The right-hand side of FIG. 3 shows the result after the system has automatically adjusted the threshold to 20, showing significant reduction in the noise level.

Figure 4:
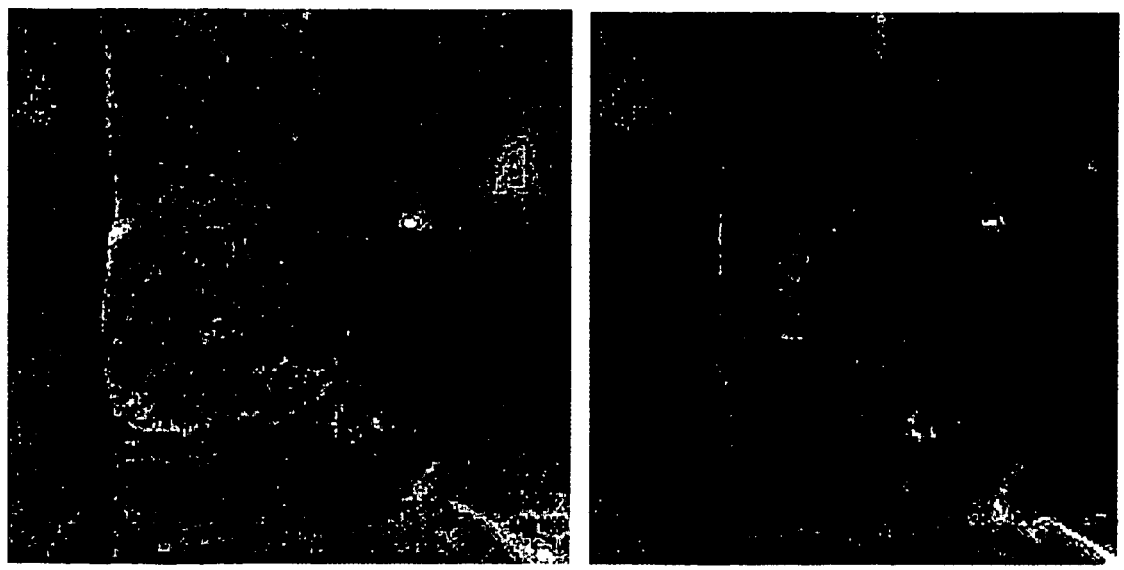
FIG. 4 shows image based adjustment in accordance with an embodiment of the present invention wherein rendering is used as a basis for further automatically adjusting rendering settings to data characteristics.

FIG. 4 shows image based adjustment in accordance with an embodiment of the present invention wherein rendering is used as a basis for automatically adjusting settings to data characteristics. The left-hand side of FIG. 3 shows rendering with a threshold of 30, resulting in holes in the wall. The right-hand side of FIG. 3 shows the result after the system has automatically adjusted the threshold to 20, showing an essentially perfect image.

Figure 5:
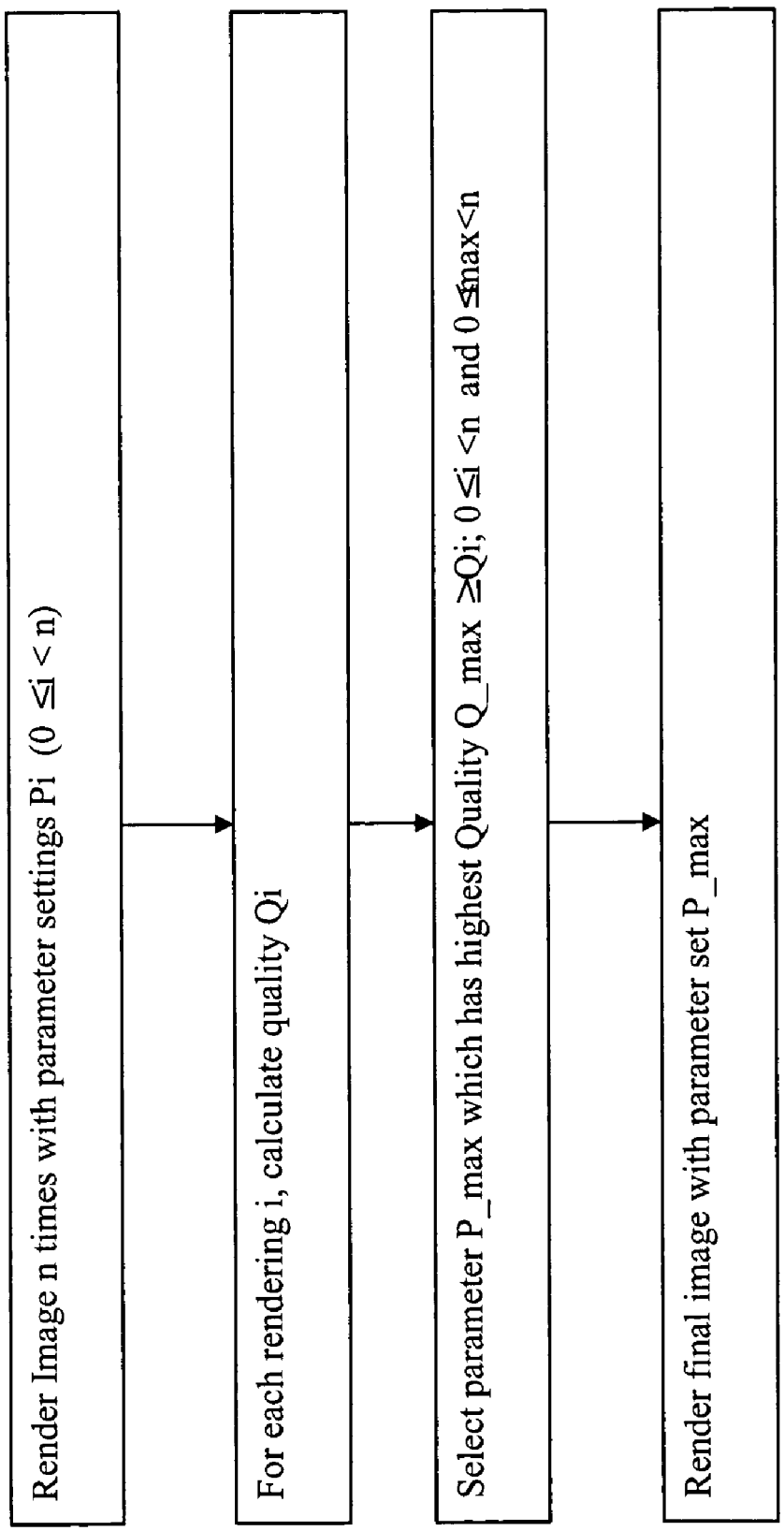
FIG. 5 shows a flow chart showing steps of a method in accordance with the present invention, wherein rendering is used as a basis for automatically adjusting rendering settings to data characteristics.

FIG. 5 shows a flow chart showing steps of a method in accordance with the present invention, wherein rendering is used as a basis for automatically adjusting rendering settings to data characteristics.

It will be understood that the invention is applicable to virtual colonoscopy as well as to various other virtual endoscopic type examinations. While the invention has been described by way of exemplary embodiments, it will also be understood by one of skill in the art to which it pertains that various changes and modifications can be made which do not depart from the spirit of the invention which is defined by the claims following.

What is claimed is:

1. A method for automatically setting a rendering parameter for a virtual endoscope for rendering images for virtual endoscopy, comprising the steps of:
   calculating a histogram H1 in area relatively close to said virtual endoscope;
   calculating a histogram H2 in area at a relatively greater distance to said endoscope;
   calculating a histogram H3 in area comprising H1 and H2;
   identifying a given peak P1 in histogram H1 as material that will be set to be transparent;
   identifying a given peak P2≠P1 in histogram H2 as material that will be set to be oblique;
   analyzing histogram H3 and setting said rendering parameter at minimum between said peaks P1 and P2; and
   rendering said image using said transfer function.

2. A method for automatically setting a rendering parameter for a virtual endoscope for rendering images for virtual endoscopy, comprising the steps of:
   deriving a data set corresponding to an inside view of a viewing frustum of said endoscope;
   rendering a plurality of images from said data set utilizing for each such image a respective rendering setting;
   utilizing a predetermined criterion to determine a respective quality factor for each such image;
   selecting as a preferred image one of said images exhibiting a quality factor having a maximum value of said respective quality factors;
   storing a preferred rendering setting associated with said preferred image; and
   utilizing said preferred rendering setting for rendering an image from said data set.

3. A method as recited in claim 2, wherein said step of utilizing a predetermined criterion comprises utilizing a smoothness criterion.

4. A method as recited in claim 2, wherein:
   said step of rendering a plurality of images comprises utilizing ray casting for deriving a plurality of pixels for each of said plurality of images;
   said step of utilizing a predetermined criterion comprises:
      calculating a respective surface normal based on lighting criteria for each of said pixels, and
      comparing a surface normal for a given pixel with a surface normal for a neighboring pixel in the same row to derive a first angle between their normals; and
   said step of utilizing a predetermined criterion comprises assigning a quality factor having the highest value for an image exhibiting the least number of faults where a fault is defined as said first angle exceeding predetermined value.

5. A method as recited in claim 2, wherein:
   said step of rendering a plurality of images comprises:
      utilizing ray casting for deriving a plurality of pixels for each of said plurality of images, and
      arranging said pixels in rows and columns;
   said step of utilizing a predetermined criterion comprises:
      calculating a respective surface normal based on lighting criteria for each of said pixels, and
      comparing a surface normal for a given pixel with a surface normal for a pixel in the same row to derive a first angle between their normals and with a surface normal of a pixel in the same column to derive a second angle between their normals; and
   said step of utilizing a predetermined criterion comprises assigning a quality factor having the highest value for an image exhibiting the least number of faults where a fault is defined as at least one of said first and second angles exceeding a predetermined value.

6. A method as recited in claim 2, wherein:
   said step of rendering a plurality of images comprises utilizing ray casting for deriving a plurality of pixels for each of said plurality of images;
   said step of utilizing a predetermined criterion comprises:
      comparing color data for a given pixel with color data for a neighboring pixel, and deriving a color difference therebetween; and
   said step of utilizing a predetermined criterion comprises assigning a quality factor having the highest value for an image exhibiting the least number of faults where a fault is defined as said color difference exceeding predetermined value.

7. A method as recited in claim 2, wherein:
   said step of rendering a plurality of images comprises: utilizing ray casting for deriving a plurality of pixels for each of said plurality of images;
   arranging said pixels in rows and columns; said step of utilizing a predetermined criterion comprises comparing color data for a given pixel with color data for a pixel in the same row to derive a first color difference therebetween and with color data for a pixel in the same column to derive a second color difference therebetween; and
   said step of utilizing a predetermined criterion comprises assigning a quality factor having the highest value for an image exhibiting the least number of faults where a fault is defined as at least one of said first and second color differences exceeding a predetermined value.

8. A method for automatically setting a rendering parameter for a virtual endoscope for rendering images for virtual endoscopy, comprising the steps of:
   deriving a data set corresponding to an inside view of a viewing frustum of said endoscope;
   rendering an image from said data set n times with parameter settings $P_i (0 \neq i < n)$ calculating a quality $Q_i$ for each such rendering; selecting a parameter $P_{max}$ which has highest quality $Q_{max} \geq Q_i$; $0 \leq i \leq n$ and $0 \leq max < n$; and
   render a final image with parameter setting $P_{max}$.

9. Apparatus for automatically setting a rendering parameter for a virtual endoscope for rendering images for virtual endoscopy, comprising:
   means for calculating a histogram H1 in an area relatively close to said virtual endoscope;
   means for calculating a histogram H2 in an area at a relatively greater distance to said endoscope;
   means for calculating a histogram H3 in an area comprising H1 and H2;
   means for identifying a given peak P1 in histogram H1 as material that will be set to be transparent;
   means for identifying a given peak P2≠P1 in histogram H2 as material that will be set to be oblique;
   means for analyzing histogram H3 and setting said rendering parameter at minimum between said peaks P1 and P2; and
   means for rendering said image using said transfer function.

10. Apparatus for automatically setting a rendering parameter for a virtual endoscope for rendering images for virtual endoscopy, comprising:

means for deriving a data set corresponding to an inside view of a viewing frustum of said endoscope;

means for rendering an image from said data set n times with parameter settings $P_i$ ($0 \leqq i < n$);

means for calculating a quality $Q_i$ for each such rendering;

means for selecting a parameter $P_{max}$ which has highest quality $Q_{max} \geqq Q_i$; $0 \leqq i > n$ and $0 \leqq max < n$; and means for render a final image with parameter setting $P_{max}$.

* * * * *